United States Patent [19]
Renk et al.

[11] Patent Number: 5,123,297
[45] Date of Patent: Jun. 23, 1992

[54] LUBRICANT RETAINING DEVICE

[75] Inventors: Richard J. Renk; Richard M. Ebert, both of Winona, Minn.

[73] Assignees: Carol Ann Mackay; Helen Lou Kurtz, both of Winona, Minn.

[21] Appl. No.: 410,083

[22] Filed: Sep. 20, 1989

[51] Int. Cl.$^5$ .................. F16H 57/04; F16J 15/00
[52] U.S. Cl. ..................... 74/606 R; 74/609; 277/208; 277/206 A
[58] Field of Search ............. 74/606 R, 421 R, 609; 277/208, 206 R, 182, 183, 178; 52/403, 398

[56] References Cited

U.S. PATENT DOCUMENTS

| | | | |
|---|---|---|---|
| 3,144,256 | 8/1964 | Wright | 277/208 |
| 3,225,175 | 6/1967 | Lower | 277/208 |
| 3,445,121 | 5/1969 | Lineker | 277/208 |
| 3,563,557 | 2/1971 | Doutt et al. | 277/178 |
| 3,710,646 | 1/1973 | Bogan | 74/609 |
| 3,727,483 | 4/1973 | Hanson et al. | 74/609 |
| 3,776,559 | 12/1973 | Cawthorn | 277/178 |
| 4,877,257 | 10/1989 | Ide | 277/206 A |

FOREIGN PATENT DOCUMENTS 0926789  5/1963  United Kingdom ........... 277/206 A

*Primary Examiner*—Rodney H. Bonck
*Assistant Examiner*—Winnie Yip
*Attorney, Agent, or Firm*—Richard J. Renk

[57] ABSTRACT

A resilient sealing device is provided for accommodating tolerance variations between a lubricant holding case and a hub member. The device has a sealing face including deformable lips which are urged toward the hub by a resilient column and deformable legs held in a retaining channel, with both the column and the legs allowing the lips to recede back into the channel while the edges of the sealing face are held by the edges of the channel.

14 Claims, 3 Drawing Sheets

LUBRICANT RETAINING DEVICE

BACKGROUND OF INVENTION

The present invention relates to the retaining of lubricant in gear cases and more particularly to retaining lubricant in traction motor gear cases such as found on diesel and electric locomotives and generally shown in U.S. Pat. No. 3,710,646, and, while not limited to these applications, will be described in that connection here.

Gear cases of this type include a pair of matable sections which are used to enclose the gears used in driving locomotive wheels.

Because of the critical nature of the gear case, it is important to retain lubricant in the case and keep dirt, brakeshoe dust, water and other contaminants out. However, up to this time, it has been difficult to retain lubricants because of the many variables involved such as the lateral movement of the locomotive axle relative to the traction motor gear case, because of the extreme vibration transmitted through the gears and wheels, and because of dimensional variations in gear cases due to manufacturing tolerances and service abuse.

SUMMARY OF INVENTION

The present invention provides an arrangement wherein lubricant is restricted in its flow outwardly of the gear case. This is accomplished by a lubricant retaining device which can accommodate wide variations in gear case mounting location and at the same time provide a stabilizing action during assembly of the gear case.

PREFERRED EMBODIMENTS

Figure 1:
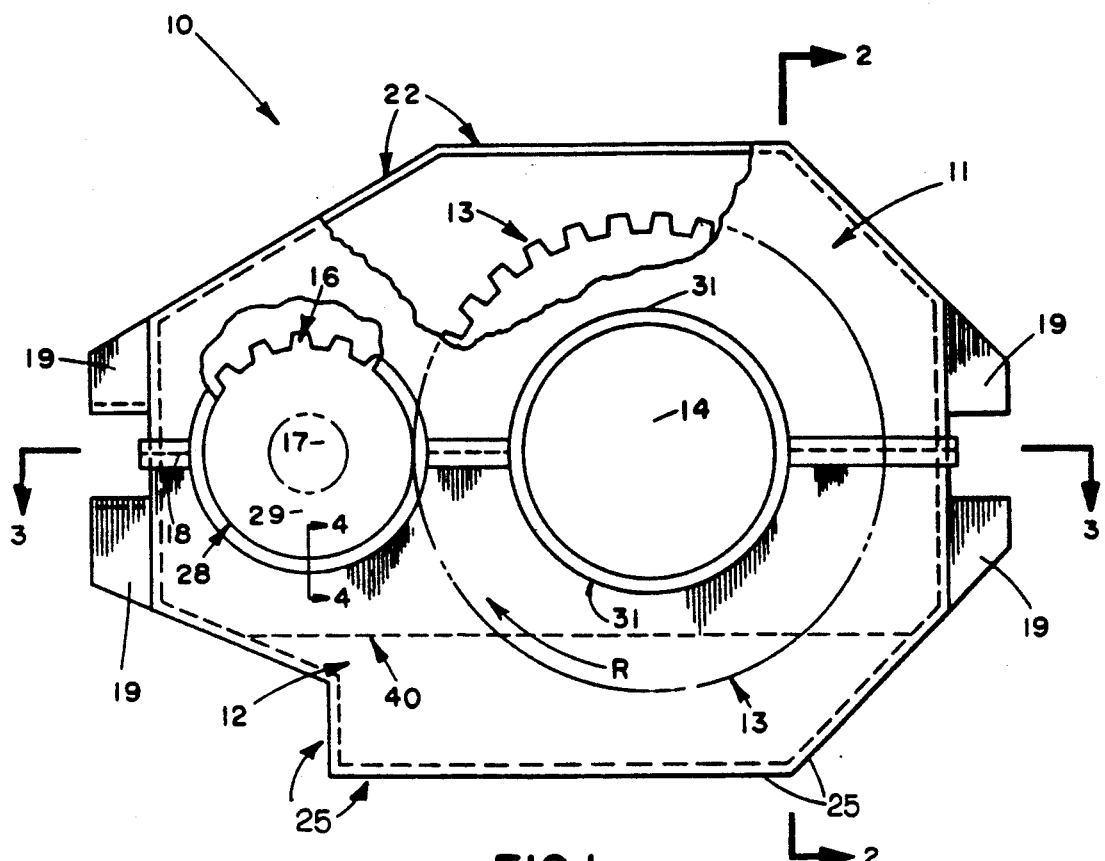
FIG. 1 is a side elevation of gear case with the concepts of the invention included therein.

In the drawings, the invention will be described with specific reference to a locomotive traction motor gear case but it is of course not limited thereto.

Figure 2:
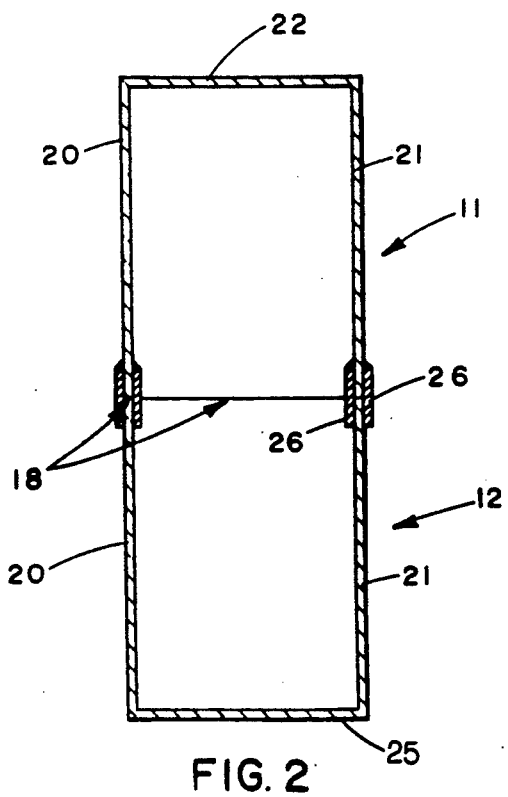
FIG. 2 is a sectional view of the gear case without the gears taken along lines 2—2 of FIG. 1 showing a typical tongue and groove arrangement as used along the mating split-line of the respective top and bottom halves of the gear case.
Figure 3:
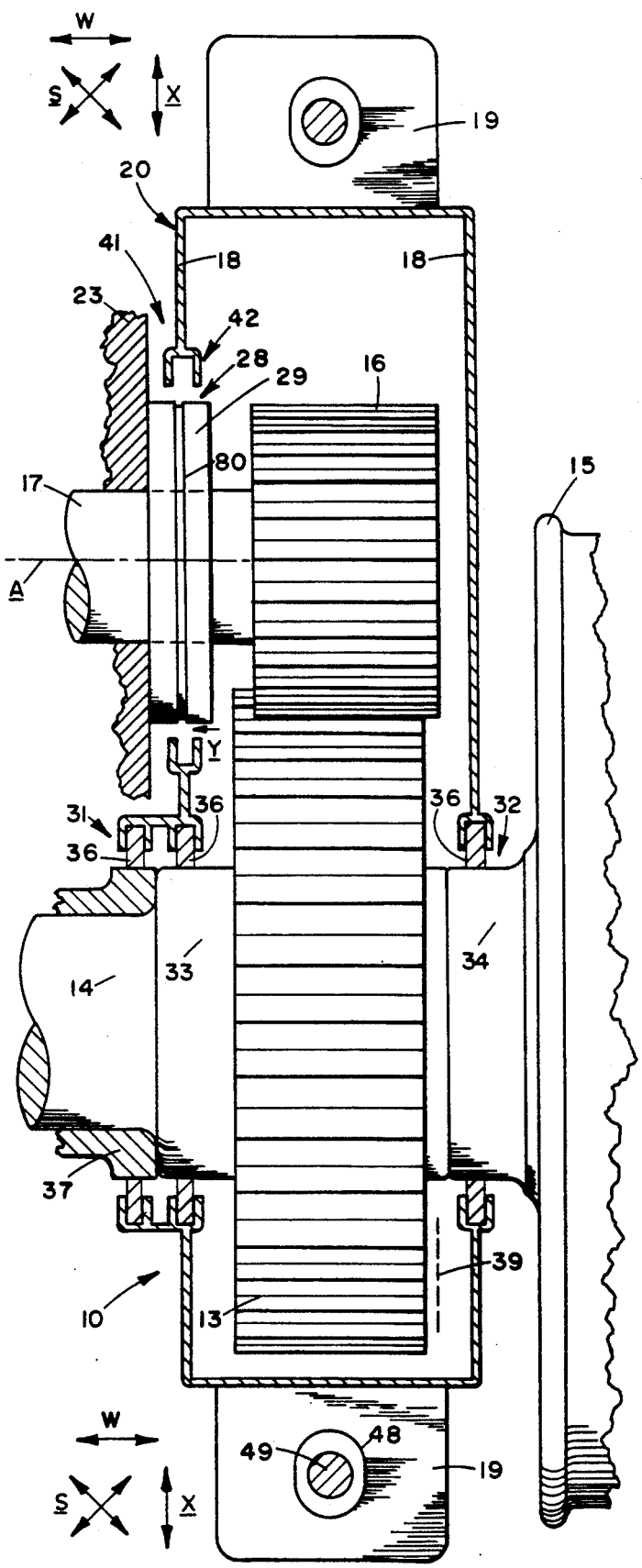
FIG. 3 is a horizontal diagrammatic sectional view of the gear case relative to locomotive traction motor pinion gear assembly taken generally along lines 3—3 of FIG. 1 just below the gear case split-line and showing the gears in elevation.

As shown in FIGS. 1-3, a typical gear case 10 comprises a pair of matable sections including an upper or top section 11 and a lower or bottom section 12 which encase moveable parts such as a bull gear 13 (carried by an axle 14) and a pinion gear 16 (FIG. 1) driven by a pinion or armature shaft 17 of a traction motor 23 (FIG. 3). The gears 13 and 16 drive axle 14 and wheels 15 (FIG. 3).

Gear Case sections 11 and 12 are somewhat similar in shape and mate at a split-line indicated at 18 (FIG. 2) to provide an enclosed structure. Brackets 19 at the gear case ends are used to clamp the sections 11 and 12 in mating relationship to supporting arms of a traction motor (not shown). As shown in FIG. 2, the upper case section 11 includes sides 20 and 21 and a top wall 22 having a series of angularly disposed surfaces. The lower section 12 has somewhat similar sides 20 and 21 and a bottom 25 with several angularly disposed surfaces.

The gear case sections 11 and 12 are kept in alignment with respect to one another along the split-line 18 by metal strips 26 welded along the top gear case sides 20 and 21. Strips 26 overhang the split-line 18 and help provide a groove area into which the split-line edge of the lower section 12 nests.

Gear case side wall 20 is provided with a semi-circular pinion bore or recess 28 (FIGS. 1 & 3) in both the top 11 and bottom 12 which align with one another to provide a circular passage to the inside of the case through which a fixed armature bearing collar or flange 29 may extend. The pinion shaft 17 passes through the collar and has the pinion drive gear 16 thereon. The top and bottom gear case sidewalls 20 also have two larger semi-circular cutouts/or recesses which align with one another to provide circular passages 31 and 32 through which a rotating surface such as a gear hub 33 and a wheel hub 34 (FIG. 3) may extend. Felt or fiber seals 36 may be used to engage the hub surfaces 33 and 34 and a suspension bearing 37.

Traction motor 23 (shown only in partial section in FIG. 3) drives the armature shaft 17 and pinion gear 16, the latter in turn drives the bull gear 13 secured to the axle 14 and wheels 15. The axle rotates in the suspension bearing 37 which is statically retained by the traction motor frame 23. The gear case 10 is bolted to the traction motor through the brackets 19 (FIG. 1). In practice, the traction motor is designed to allow for lateral or axial movement between the axle 14 and the suspension bearings 37.

Since the gear case 10 is fixed with respect to the traction motor 23 and its suspension bearing 37, the bull gear 13 (and axle 14) may move laterally (axially) to the position indicated by the dotted line 39 (FIG. 3) while the pinion gear 16 remains in the same position. This lateral movement may generally be 1/16" to 5/16".

It is this lateral relative movement between the gear case 10 and the bull gear 13 (carried by the axle) which has made it extremely difficult to keep lubricants in the gear case because of the pumping action and alternate lateral pressures of lubricant on the pinion bore cutout area 28. In service, even under reasonable speeds, the lateral oscillations can be 30 to 90 cycles per minute. With a locomotive traveling 12,000 to 20,000 miles per month, lubricant losses can be quite high and require a locomotive to make numerous time-consuming and costly refilling stops.

An example of the lubricant pressures generated within a gear case is depicted diagrammatically in FIG. 1. For example, if the bull gear 13 is rotating in the direction R, its teeth scoop or lift lubricant 40 from the bottom of the case and splash it onto the pinion gear 16. Meshing of the teeth of the bull gear and pinion gear acts in the nature of a gear pump and causes the lubricant to squirt or spray sideways under high pressure toward the sides of the case and bore 28. This pressure, shown by the arrow Y (FIG. 3), places high fluid pressure along the bore area 28.

As a further aspect, in addition to keeping lubricants in the case, it is also important to keep water and dirt out of the gear case to reduce lubricant dilution and gear wear. Snow, dirt and water can collect in the space 41 between the traction motor frame (shown partially at 23) and the side of the gear case 20.

Figure 4:
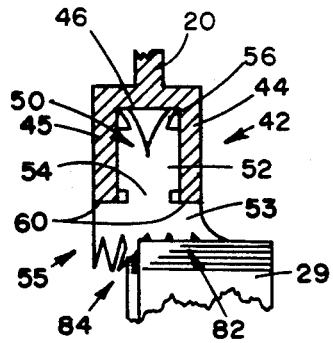
FIG. 4 is a sectional view taken along lines 4—4 of FIG. 1 showing the lubricant retaining or interface device in side elevation without cross hatching for ease of illustration showing one of the many varied positions under which the device has to operate.

As shown in FIG. 4, the pinion bore or cutout 28 is defined by a holding means 42 which may be in the form of a channel (FIGS. 3 & 4) formed by an inner side wall 44, an outer side wall 45 and a bottom 46. The channel or groove 42 faces or opens radially inwardly toward the cylindrical collar 29.

In addition to the lubricant pressures within the gear case causing leakage problems through the pinion cutout 28, other retention problems through the cutout are encountered because of the large mounting tolerances permitted by the mounting brackets 19. Due to the clearance between bracket's longitudinal hole 48 (FIG. 3) and the bolt 49, the gear case 10 may shift during assembly up to approximately ⅜″ relative to the pinion collar 29 as depicted by the arrow X (FIG. 3) and 5/16″ laterally or axially in the direction of arrow W. (Normal clearance between the holding channel 42 and hub 29 is approximately 3/16″.) This, of course, can be compounded by the gear case being skewed in the direction S with one end being shifted toward the motor 23 and the other end being shifted toward the wheel 15. The clearance between the hole 48 and bolt 49 has been intentional so that those cases which have been bent or damaged by debris along a railroad roadbed can be repaired and returned to service without too much concern for some warpage during repair.

Another factor which requires the case to be very tolerant of mounting accuracy has been the policy of making the gear cases interchangeable with locomotives which might be 30-35 years old so that maintenance practices and costs can be kept as economical as possible. While these practices have helped the railroads keep interchangeability, they have also made it very difficult to seal the gear case along the bearing collar 29.

Figure 6:
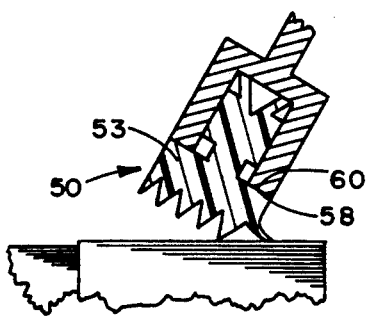
FIG. 6 is a sectional view of the lubricant retaining device somewhat similar to FIGS. 4 and 5 showing how the device can adjust to tilting or tipping as a gear case half is being slid into position for mounting.

The relatively thin collar area 29 (in some areas in the nature of ⅜″ wide) also accentuates leakage with lateral shifting of a gear case as illustrated in FIG. 4. In addition to the shifting problem, since the gear case is made in halves 11 and 12, often times one or both are tilted or tipped during a somewhat blind assembly while nesting between the wheel 15 and motor frame 23 as illustrated in FIG. 6.

Now, in accordance with the present invention, to overcome the problem of lubricant losses due to gear case shifting, misalignment, tilting, etc., there is provided a novel lubricant retaining or interface device 50 (FIGS. 4-9). The retaining device 50 may be molded from a resilient material such as a pliant, deformable elastomeric material.

Figure 7:
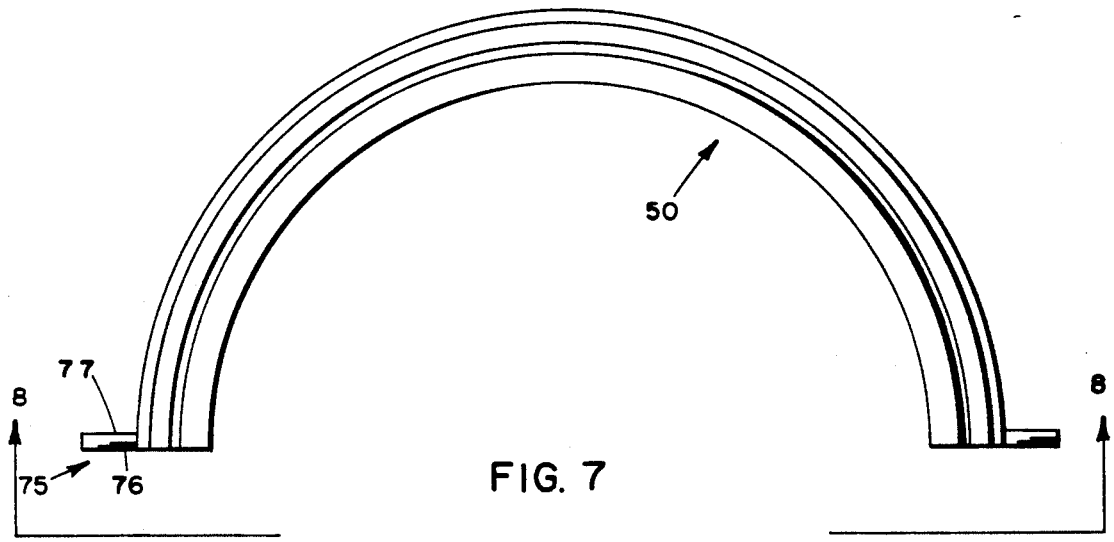
FIG. 7 is a side view of the lubricant retaining device.
Figure 9:
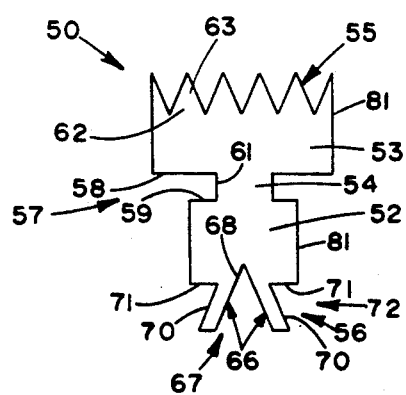
FIG. 9 is a view taken along lines 9—9 of FIG. 8 showing the retaining device in side elevation without cross-hatching for ease of description.

Specifically, as shown in FIGS. 4 & 9, the device 50 includes a base 52, contact means such as a rim 53 having compressible lips 55, means 54 such as a column connecting the rim to the base, and biasing means such as deformable legs 56 extending from the base. While not limited to any specific contour, the device as shown in FIG. 7 may be formed to take on an arcuate or circumferential shape and be used as two generally semi-circular halves to form a circle.

Specifically, base 52 extends circumferentially and is preferably sized to be slightly wider than the inside width of the holding channel 42 between the sides 44 and 45 so as to be resiliently held in the channel. The column or connecting means 54 extends from the base 52 in a radially inward direction toward the collar 29. The column is of a smaller or thinner cross sectional width or thickness (extending in an axial direction parallel to the rotational axis "A" of armature shaft 17) than base 52 and rim 53 and is defined on its sides by circumferential or arcuate grooves or relieved areas 57 (FIG. 9). The grooves 57 are formed by the underside wall 58 of rim 53 and a short top wall 59 of base 52, both walls being joined by a connecting side wall 61 of column 54.

Figure 5:
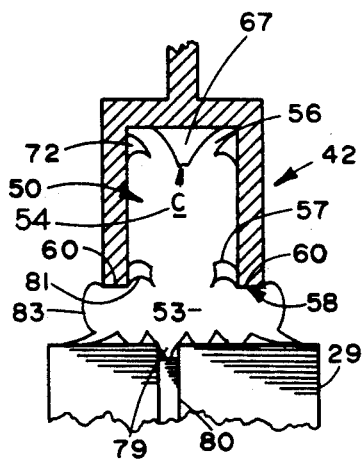
FIG. 5 shows another typical position of the retaining device of the invention illustrated in side elevation somewhat as in FIG. 4 for ease of description.

Rim 53 is connected to the column 54 and is located radially inwardly therefrom (toward collar 29). As shown in FIGS. 4-6, rim 53 projects wider than column 54 and base 52 and preferably is generally at least as wide as the outside width of channel 42 (across channel sides 44 and 45). In other words, it extends under arcuate edges 60 of the holding channel sidewalls 44 and 45 which define the bore 28 (FIGS. 4 & 6). Thus, the rim 53 extends wider than base 52 and preferably at least as wide as the outside width of channel 42 so as to bear against the channel edges 60 which provide support for the rim as will be discussed later.

Extending from the radially inward side of rim 53 are the lips 55. The lips are formed to deformably engage the collar 29. A suitable lip shape is shown in FIG. 9 illustrating how the circumferentially or arcuately extending lips have a somewhat triangular cross section. Specifically, the lips may have a wider base or bottom 62 extending from rim 53 and may taper radially inwardly to somewhat of a pointed edge or tip 63.

For the purpose of urging the device toward and into contact with the collar 29, there is provided the biasing means 56 which may include deformable resilient legs (FIG. 9). The inside edges 66 of the legs define a V-notch 67 with the apex 68 thereof extending into the base 52 with the wider open bottom facing radially outwardly toward the holding channel bottom 46. The outside tapered edges 70 of the legs together with a short axially extending outer wall 71 of base 52 define arcuately extending pockets 72 with somewhat of a triangular cross section opening toward the respective holding channel side walls 44 and 45. As can be seen in FIG. 9, the V-notch apex 68 is radially inwardly toward the lips 55 farther than the outer wall 71 of base 52.

Figure 8:
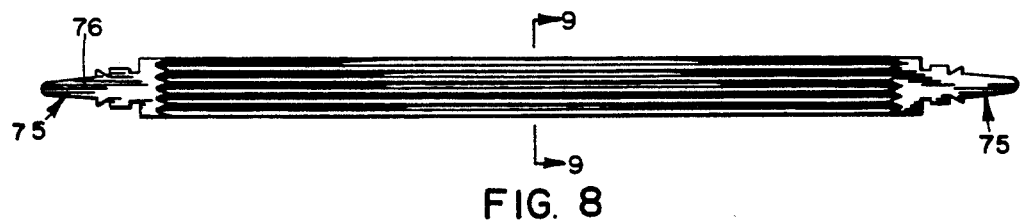
FIG. 8 is a view of the device taken along lines 8—8 of FIG. 7.

For purposes of positioning the lubricant retaining or interface device 50 and also providing good mating contact between the ends of two adjoining semi-circular halves, there may be provided shut off means 75 at the ends such as tabs or flaps (FIGS. 7 and 8). The tabs project radially away from and at somewhat right angles to the base 52. As will be seen in FIG. 8, the tabs block off the V-notch 67 in the base ends and extend laterally away from the base 52 and generally parallel to the gear case split line 18 (FIG. 1). If two devices are mated together, the top surfaces 76 of the respective butting tabs 75 will engage one another. The underside tab surface 77, will then engage the gear case side sheet 20 and 21 of either the top or bottom gear case halves 11 and 12 along their mating split lines 18.

In use, a semi-circular retaining device 50 is inserted in each of the semi-circular holding channels 42 of the top and bottom gear case halves 11 and 12 with the biasing legs 56 engaging the channel bottom 46. When inserted, the base 52 will generally provide a slight interfering or compressive fit against the channel inside walls 44 and 45.. As shown in FIGS. 4–6, the base 52 generally will be confined within the channel 42 as will be most of the column 54 and its adjacent side grooves 57.

A typical installation of the retaining device 50 is shown in somewhat exaggerated form in FIG. 5. With the gear case halves 11 and 12 bolted in place, the resilient biasing legs 56 may deform and urge the device toward the collar 29 to provide pressure on the lips 55. Where an irregularity appears in the collar 29, the lip(s) is urged into engagement therewith as shown by the lip 79 (FIG. 5) extending into a recess 80. At the same time, the arcuate side edges 60 of the holding channel 42 bear against the device's rim wall areas 58 and urge the lips along the outside edges of the device into engagement with the collar 29. Thus, the device can be subjected to several pressures, i.e. from the resilient legs 56 and from the channel edges 60.

To accommodate additional pressures on the device 50 resulting from gear case mounting as shown in FIG. 5, the device can relieve itself by having the rim 53 bulge back into the side grooves 57 as at 81. At the same time, column 54 can recede further into the channel 42. For example, the column 54 can also bulge somewhat laterally into groove 57 and radially outwardly in the direction C into the base 53 as the V-notch 67 allows the base area under column 54 to deform between the resilient legs 56. To further accommodate gear case pressures, the legs 56 can then bend or deflect into their side pockets 72, and the rim sides 83 can bulge laterally in an axial direction outwardly or beyond the outside of channel walls 44 and 45.

Another feature of the invention is illustrated in FIG. 4 wherein it is shown how the retaining device can adjust for misaligned or offset mounting of a gear case due to the excess clearance between the bracket mounting holes 48 and bolts 49. This view shows how the center lips indicated at 82 firmly engage the circumferential surface of collar 29 while at the same time another lip 84 straddles and engages side ridges of the collar.

A further advantage of the device is illustrated in FIG. 6 wherein it is shown how a gear case half 11 or 12 is often times tipped or jostled during the somewhat blind installation between the wheel 15 and traction motor frame 23. Because the rim underside wall 58 is in effect backed-up and supported by the channel edges 60 and because of the relatively short length of the lips 55, the tendency for the lips to fold under toward the center of the rim 53 is substantially reduced thereby helping to prevent improper lip contact with the collar 29 and also stabilizing the device.

While the device has been described with reference to a traction motor gear case, it of course is not limited applications of this type. It can be used to isolate a first member from a second member and has particular advantages where misalignment can occur such as where the first member might be likened to a gear case and the second member might have some general imprecise but important interfacing requirement such as the collar 29. Moreover, although the invention has been described in terms of certain specific embodiments, it is to be understood that other forms may be adopted within the scope of the invention as defined in the appended claims.

What we claim is:

1. An interface device for isolating a first member from a second member, said first member having an arcuate groove defined by side walls joined by a bottom wall and opening radially inwardly toward a second member, said device comprising, an arcuately extending base having a bottom wall and side walls for insertion into said first member's groove and between said side walls thereof and adapted to be carried by said first member, contact means positioned radially inwardly from said base toward said second member for engagement with said second member, connecting means radially outwardly from said contact means and between said base and said contact means securing said contact means to said base, said connecting means including a unitary compressible column generally centered with respect to the axial cross sectional width of said base and being thinner than the axial width of said base, biasing means extending radially outwardly from said bottom wall of said base in a direction opposite from said contact means and spaced radially outwardly therefrom for engagement with said bottom wall of said groove in said first member for urging said contact means toward said second member.

2. An interface device as claimed in claim 1 wherein said biasing means extends arcuately along said base.

3. An interface device as claimed in 1 wherein said biasing means includes spaced apart deflectable legs.

4. An interface device as claims in claim 1 wherein said biasing means includes legs spaced apart by a notch which extends radially inwardly into said base and opens radially outwardly therefrom toward said first member.

5. An interface device as claimed in claim 1 wherein said biasing means has circumferentially extending pockets on opposite sides thereof.

6. An interface device as claimed in claim 1 wherein said contact means includes a number of radially inwardly projecting lips for engagement with said second member which may deflect toward or away from one another.

7. An interface device as claimed in claim 1 wherein said device has an end and wherein a shut-off means is provided adjacent said end projecting radially outwardly at an angle to said end and to a greater radial diameter than said biasing means.

8. An interface device as claimed in claim 7 wherein said device is somewhat semi-circular having a pair of ends and a shut off means is provided at each end extending radially away therefrom.

9. An interface device for isolating a first member from a second member wherein said first member includes a channel having a bottom and side walls provided with edges and opening toward said second member, said device comprising, a base for insertion into said channel of said first member, said base having sides which are sized to fit between said channel side walls, contact means for engagement with said second member, said contact means being spaced radially inwardly from said base toward said second member and including a rim having a lip for projecting inwardly for engagement with said second member, connecting means joining said contact means with said base, said connecting means being between said base and said contact means and being of lesser widths than said rim, and resilient means for nesting within said channel extending from said base in a direction generally opposite from said lip and paced therefrom toward said first member, said resilient means having a part thereof for engaging said bottom wall of said channel and acting to urge said device toward said second member, said resilient means also being deformable to allow said base to recede within said channel toward said resilient means and said channel bottom wall as said connecting means is forced toward said bottom wall by movement of said contact means toward said first member.

10. An interface device as claimed in claim 9 wherein said connecting means includes a compressible solid column generally centered with respect to said channel side walls and said rim, and said resilient means includes means for allowing said column and said base to recede toward said channel bottom wall.

11. A interface device as claimed in claim 10 wherein said resilient means for allowing said base and column to recede toward said channel bottom wall includes legs carried by said resilient means spaced from one another to provide a notch which extends into said base and opens outwardly toward said channel bottom wall of said first member.

12. An interface device as claimed in claim 9 or 10 wherein said rim extends as a continuous member between said channel side walls and at least as wide as the outside width of said channel side walls so as to enable said rim to bear on edges of said side walls.

13. An interface device as claimed in claim 9 wherein said channel is carried by a gear case having complimentary sections defining a mating split-line between said sections, each section being provided with a generally semi-circular portion of said retaining channel, said channel portions mating with one another along said split-line to define a circular cutout, each of said channel portions opening radially inwardly toward said second member, said device being somewhat semi-circular having an end and shut-off means projecting at an angle to and generally radially away from said end and to a greater radial diameter than said base and said contact means so as to extend outwardly of and beyond said channel and along said case split-line between said complementary gear case sections.

14. An interface device for use with a traction motor gear case having two halves each provided with oppositely facing semi-circular openings with generally semi-circular retaining channels and together defining a circular cutout, said channels mating with one another along a split-line and each channel having a bottom wall and side walls and opening radially inwardly toward a circular collar member carried by said traction motor and projection into said gear case cutout, said channel side walls having semi-circular edges facing said collar member and being spaced therefrom said device comprising, a base having a bottom wall and side walls extending along a generally semi-circular arc for insertion in said channel, a rim extending in a generally semi-circular arc having a lip projecting radially inwardly along one side thereof engagement with said collar, connecting means radially outwardly from said resilient rim and between said base and said rim joining said rim and said base, said connecting means being of a narrower transverse width than said rim and said base and together with surfaces of said base and said rim defining grooves along sides of said connecting means into which a portion of said rim may deflect when said device is installed in said channel, said rim extending under at least a portion of said channel side edges and radially inwardly therefrom toward said collar with sides of said rim being adapted to be engaged by said channel edges when installed in said channel to provide support for said rim, said rim being capable of being deformed transversely of said device when subjected to pressure of said device against said collar, resilient means extending radially outwardly from said base in a generally semicircular arc and adapted to engage the channel bottom wall and provide yieldable support for said device, said resilient means including bendable legs separated by a notch, said notch opening radially outward toward the channel bottom wall and being generally in line with said connecting means, said legs on their outside together with a portion of said base defining a relieved pocket therealong, said notch and said pockets adjacent said legs providing room for said legs to deflect and also allow said connecting means to deform said base toward said legs when said device is in its installed position in said channel.

* * * * *